(12) United States Patent
Teo

(10) Patent No.: US 7,201,417 B2
(45) Date of Patent: Apr. 10, 2007

(54) COVERING MECHANISM

(75) Inventor: Owain Teo, Novi, MI (US)

(73) Assignee: Nissan Technical Center North America, Inc., Farmington Hills, MI (US)

(*) Notice: Subject to any disclaimer, the term of this patent is extended or adjusted under 35 U.S.C. 154(b) by 58 days.

(21) Appl. No.: 11/154,970

(22) Filed: Jun. 16, 2005

(65) Prior Publication Data

US 2006/0284436 A1    Dec. 21, 2006

(51) Int. Cl.
*B60R 7/04* (2006.01)
(52) U.S. Cl. .................. 296/24.4; 296/37.16; 160/250; 160/323.1
(58) Field of Classification Search ............. 296/37.16, 296/24.4, 141–143; 160/250, 323.1
See application file for complete search history.

(56) References Cited

U.S. PATENT DOCUMENTS

| | | | |
|---|---|---|---|
| 4,168,094 A | * | 9/1979 | Yagi ........................ 296/37.16 |
| 5,618,077 A | | 4/1997 | Ament et al. |
| 5,676,415 A | | 10/1997 | Ament et al. |
| 5,813,449 A | | 9/1998 | Patmore et al. |
| 5,961,172 A | | 10/1999 | Ament et al. |

* cited by examiner

*Primary Examiner*—Dennis H. Pedder
(74) *Attorney, Agent, or Firm*—Rader, Fishman & Grauer PLLC

(57) ABSTRACT

A covering mechanism for covering a portion of a vehicle. The covering mechanism includes a cassette, at least one inner end cap disposed at an end of the cassette, and at least one outer end cap disposed over the inner end cap. The outer end cap is movable between a retracted position and an extended position.

17 Claims, 6 Drawing Sheets

COVERING MECHANISM

BACKGROUND

Covering mechanisms are often used in vehicles, for example, to obscure the view of items and materials in a cargo region of a vehicle. Such covers may include a cassette having a cover that can be scrolled and un-scrolled to cover and uncover the items and materials in the cargo region.

BRIEF DESCRIPTION OF THE DRAWINGS

The present invention will now be described, by way of example, with reference to the accompanying drawings, in which.

DETAILED DESCRIPTION

Figure 1:
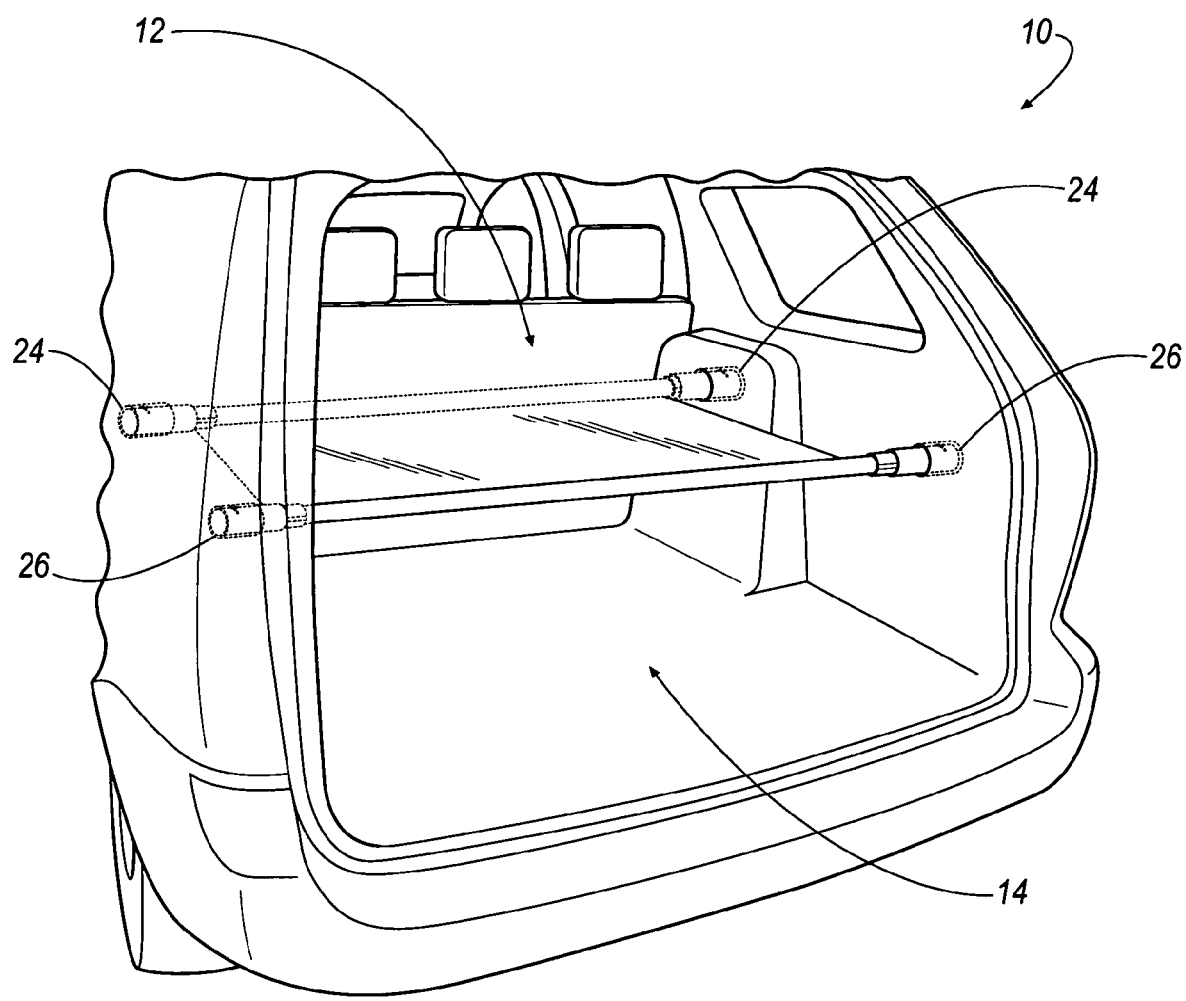
FIG. 1 is a schematic perspective view of a vehicle including a covering mechanism according to an embodiment of the present invention.

Referring now to FIG. 1, an embodiment of a covering mechanism according to the present invention is shown and described. In FIG. 1, a vehicle 10 is shown including a cargo region 14. The cargo region 14 may be any number of regions in the vehicle 10 used for storing or retaining items or other cargo. In the example depicted in FIG. 1, cargo region 14 is shown associated with a rear portion of the vehicle 10. However, one skilled in the art will recognize that the cargo region 14 may also be associated with many other regions or locations within a vehicle.

In the exemplary embodiment illustrated in FIG. 1, cargo region 14 includes receiving areas 24 and 26, which may be apertures, formations, areas, or recesses positioned within walls of the cargo region 14. The receiving areas 24 and 26 are adapted to receive portions of the covering mechanism 12, such as will be described. In the example shown, the spacing between the receiving areas 24 is narrower than the spacing between receiving areas 26. Such spacing differences may result from, for example, geometric or design considerations associated with the cargo region 14. Other considerations may also result in different spacing associated with the receiving areas 24 and 26. As such, the spacing contemplated by embodiments of the present invention may vary from that shown in the Figure, and the invention should not be limited to the embodiments shown and described herein. One skilled in the art will also recognize that the receiving areas may be located at other locations and that additional receiving areas may be included in addition to those described in the examples and exemplary embodiments set forth herein.

A covering mechanism 12 according to an embodiment is shown in use covering different portions of a cargo region 14. The covering mechanism 12 may, for example, be interlocked or interconnected with receiving areas 24 to partially cover the cargo region 14 or may be interlocked or interconnected with receiving areas 26 to substantially or completely cover the cargo region 14. Those skilled in the art will recognize many variations in addition to those illustrated and described herein.

Figure 2:
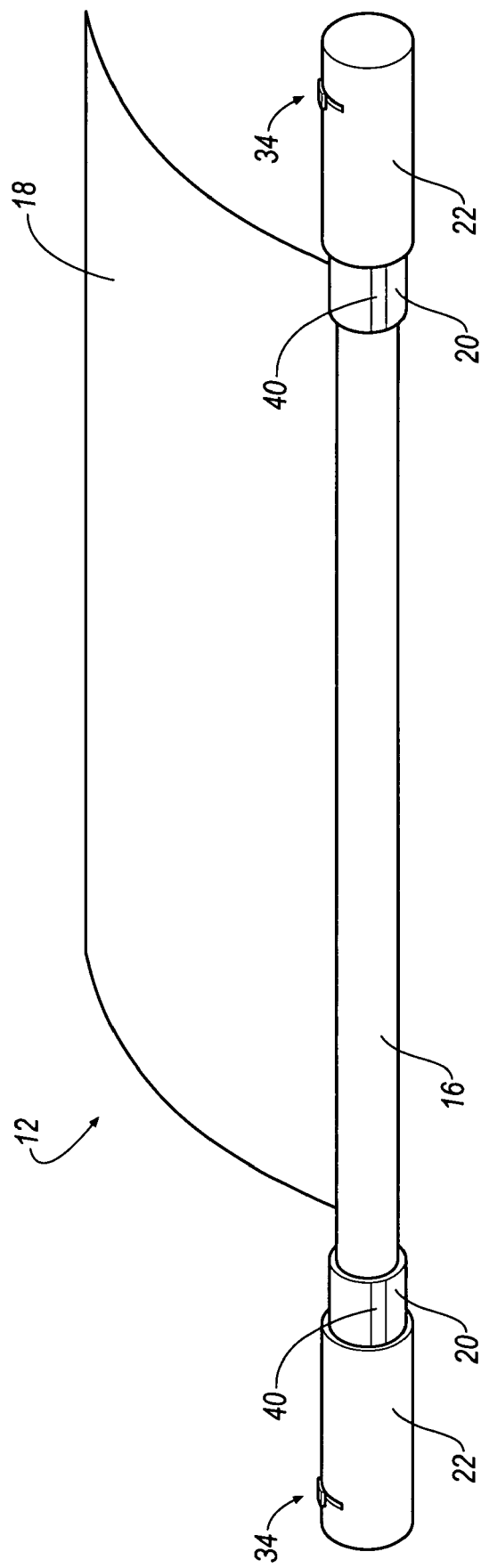
FIG. 2 is a perspective view of a covering mechanism according to an embodiment of the present invention.

Referring now to FIG. 2, an embodiment of the covering mechanism 12 is shown and described in further detail. As shown in FIG. 2, the covering mechanism 12 generally includes a cassette 16 and a cover 18. The cover 18 may, for example, be rolled or spooled within the cassette 16 such that, upon pulling the cassette 16 into a covering position (see FIG. 1), the cover 18 may be unraveled or unspooled to cover (or partially cover) the cargo region 14. Accordingly, such as generally shown in FIG. 1, when the cassette 16 is pulled from the location of receiving areas 24 to receiving areas 26, the cover 18 then unravels or unspools to add additional cover to the cargo region 14.

With continued reference to FIG. 2, the illustrated embodiment of covering mechanism 12 further includes an inner end cap 20 and an outer end cap 22. The inner end cap 20, for instance, may be spring-loaded such that the compression of inner end cap 20 against cassette 16 may cause inner end cap 22 to telescope or move inwardly. This compression reduces the overall length of the cassette 16 to permit the outer end caps 22 to be positioned within receiving areas 24 or 26 (as for example shown in FIG. 1).

Figure 3A:
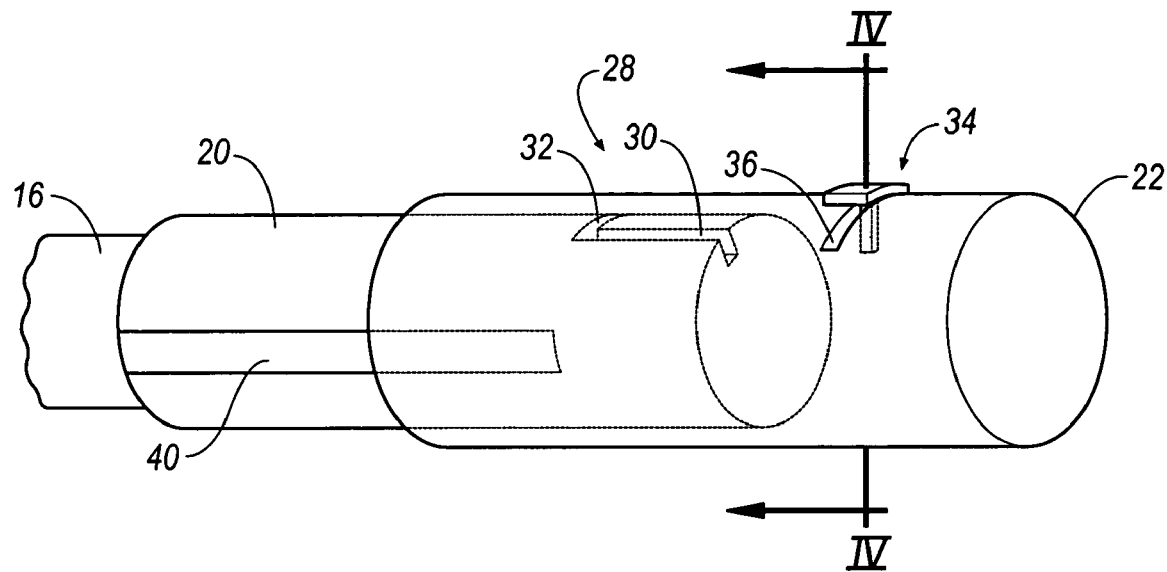
FIG. 3A is a perspective view of a component for a covering mechanism according to an embodiment of the present invention.
Figure 3B:
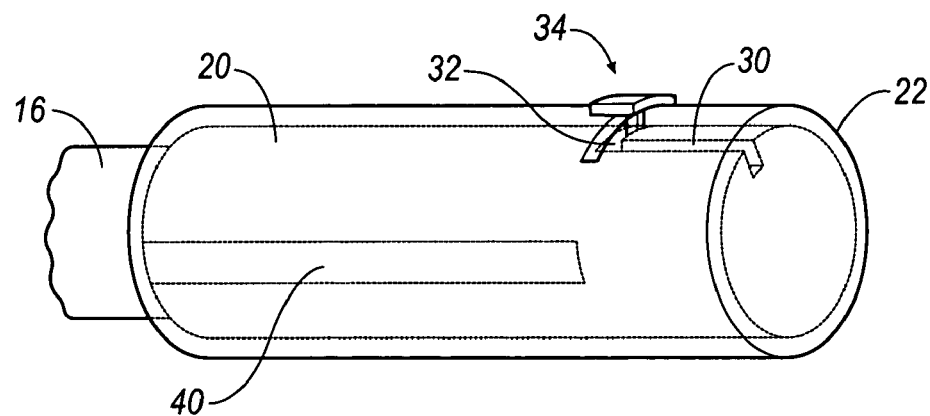
FIG. 3B is a perspective view of a component for a covering mechanism according to an embodiment of the present invention.

In an embodiment, such as generally shown in FIGS. 3A and 3B, outer end caps 22 may be configured to retractably or telescopingly move in and out over inner end caps 20. Such a configuration can permit additional variation in the width (and functional width) of the cassette 16 by, for example, adjusting the positioning of the outer end caps 22. Such adjustment can provide the cassette 16 with, among other things, a more useful or correct overall length to engage, for instance, wider-spaced receiving areas 26 or narrower-spaced receiving areas 24.

In FIG. 3A, an outer end cap 22, according to an embodiment, is shown in a wider or extended position while FIG. 3B illustrates the outer end cap 22 in a retracted or narrower position. As illustrated in FIG. 3A, inner end cap 20 includes a track 28 that has a first portion 30 that extends axially and a second portion 32 that is disposed radially with respect to the inner end cap 20. The first portion 30 and second portion 32 provide an overall path for guiding the outer end cap 22 from the extended to the retracted position.

Outer end cap 22 may include at least one tab 34 disposed in a groove 36. The bottom portion (with respect to the Figure) of tab 34 extends inside the outer end cap 22 such that, unless the tab 34 resides in the track 28, the tab 34 interferes or abuts against the inner end cap 20 to prevent the outer end cap 22 from moving to the retracted position of FIG. 3B. Thus, as shown in FIG. 3A, when the outer end cap 22 is in the extended position, tab 34 is positioned axially outside the inner end cap 20. As shown in FIG. 3B, when the outer end cap 22 is in the retracted position, the tab 34 resides in the second portion 32 of the track 28 to generally maintain the outer end cap 22 in the retracted position.

Figure 4:
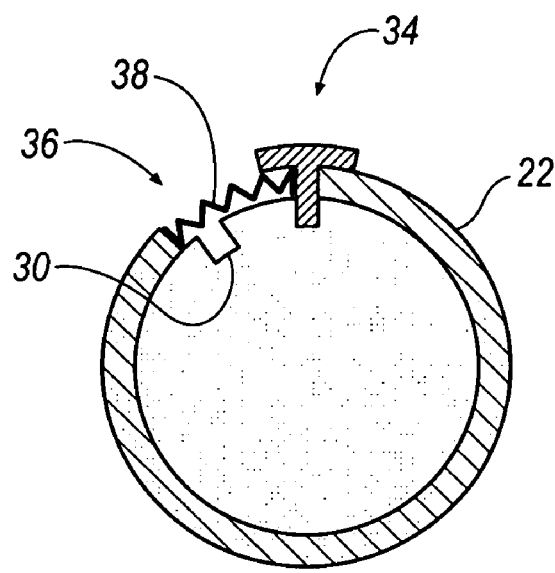
FIG. 4 is a cross-sectional view along IV—IV in FIG. 3A according to an embodiment of the present invention.
Figure 5:
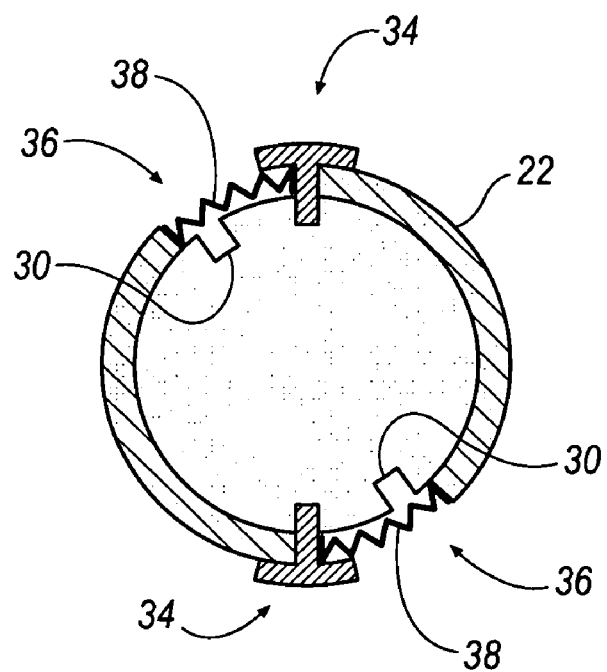
FIG. 5 is a cross-sectional view of a component for a covering mechanism according to an embodiment of the present invention.
Figure 6:
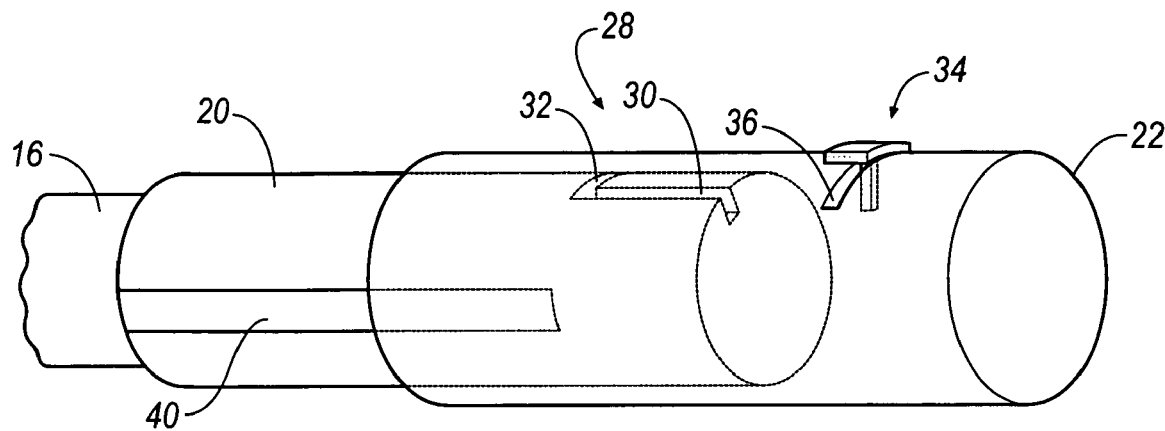
FIG. 6 is a perspective view of a component for a covering mechanism according to an embodiment of the present invention.
Figure 7:
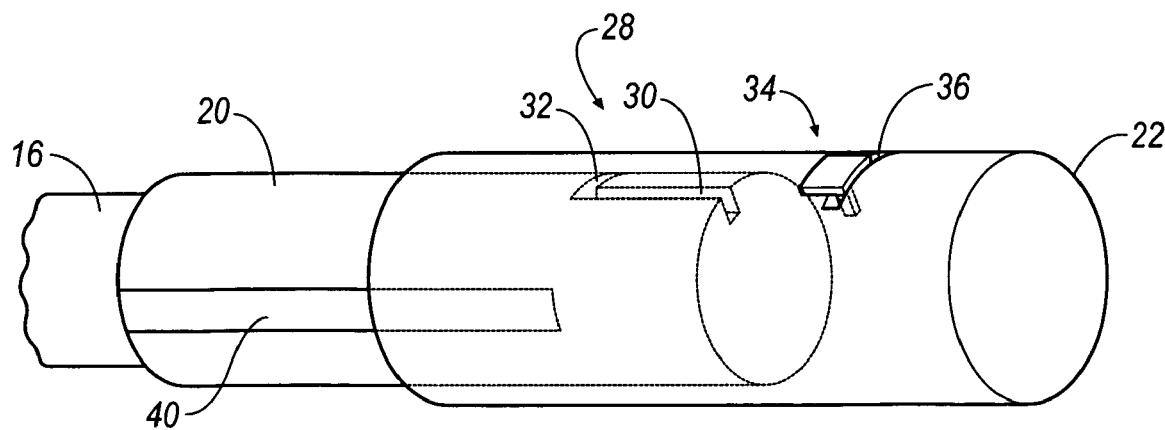
FIG. 7 is a perspective view of a component for a covering mechanism according to an embodiment of the present invention.

Referring to FIG. 4, a cross-section through IV—IV of FIG. 3 illustrates tab 34 and groove 36 in greater detail. In an illustrated embodiment, tab 34 is pushed to one side of the groove 36 by a biasing member 38, such as a spring. Thus, tab 34 is movable back and forth from an unbiased (right side with respect to the Figure) position to a biased (left side with respect to the Figure) position in groove 36. When tab 34 is in the unbiased position, tab 34 is substantially unable to enter the track 28 and outer end cap 22 is locked in the extended position such as shown in FIG. 3A. When tab 34 is moved to the biased position, tab 34 is substantially aligned with track 28 and outer end cap 22 may then move to the retracted position such as shown in FIG. 3B. It will be noted that, as for example shown in FIG. 5, more than one tab 34 and track 28 may be used. More specifically, multiple tabs 34 and tracks 28 may be used in accordance with embodiments of the invention.

Figure 8:
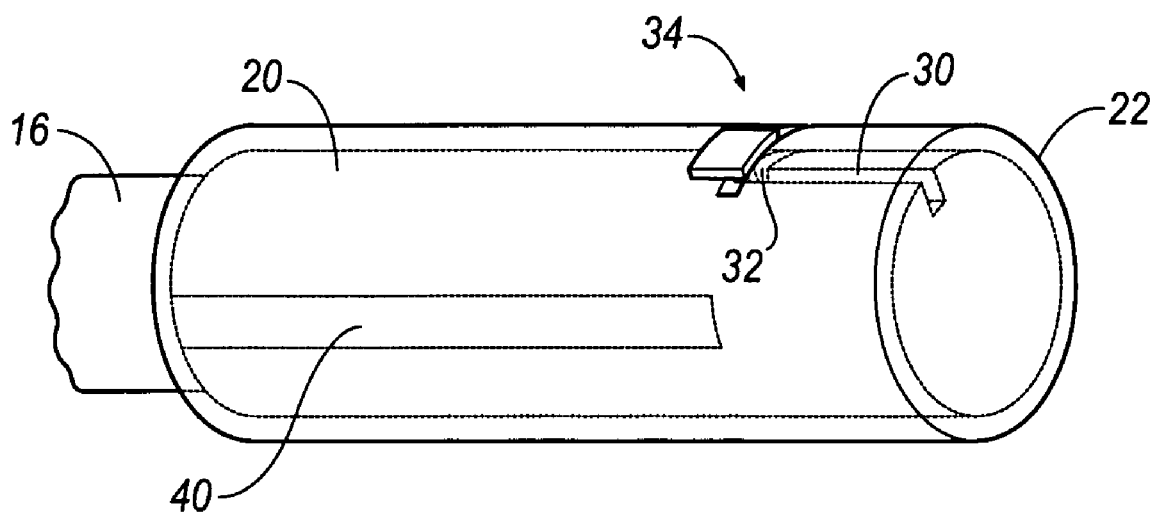
FIG. 8 is a perspective view of a component for a covering mechanism according to an embodiment of the present invention.
Figure 9:
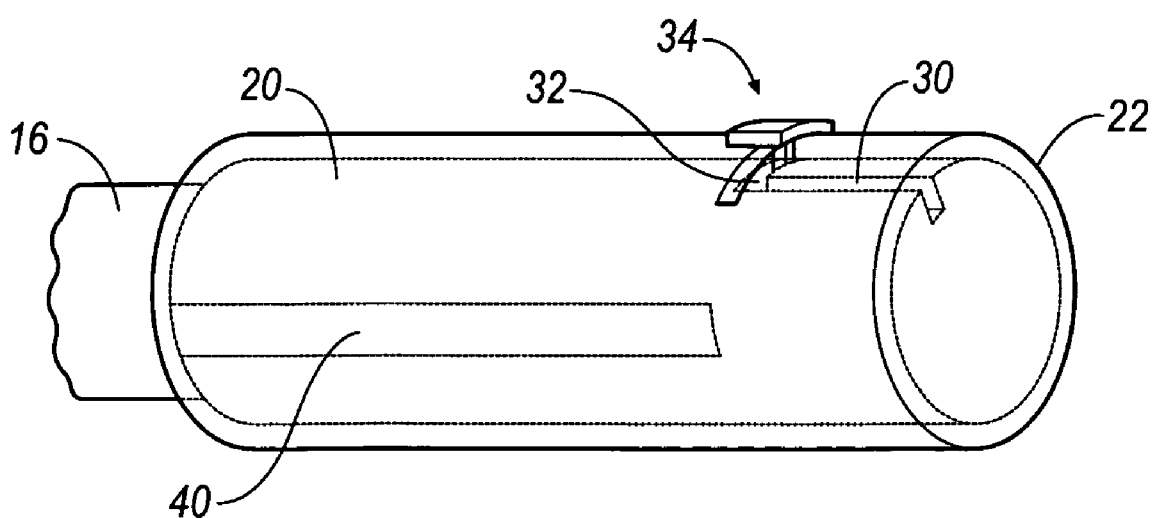
FIG. 9 is a perspective view of a component for a covering mechanism according to an embodiment of the present invention.

Referring to FIGS. 1 and 6–9, an operation of an embodiment of the present invention is shown and described. In operation, cassette 16 is moved from receiving areas 26 to receiving areas 24 (e.g., see FIG. 1). To accomplish this, in an embodiment, cassette 16 is forced or pressed against one or the other of the receiving areas 26 to compress at least one of the end caps 20 and allow removal of the cassette 16 from the receiving areas 26. Next, tab 34 is moved along groove 36 against biasing member 38 to move from, for example, the position shown in FIG. 6 to the position shown in FIG. 7. This causes tab 34 to generally align with track 28 (see e.g., FIG. 4). Outer end cap 22 is then slid toward the retracted position, for example, as shown in FIG. 8. A guide 40 restrains the outer end cap 22 from rotating with respect to inner end cap 20 to permit only axial movement. During this sliding movement, tab 34 passes down along first portion 30 until intersecting or interconnecting with second portion 32, for example, as shown in FIG. 8. Then, for example as shown in FIG. 9, tab 34 is released and biasing member 38 moves the tab 34 into the second portion 32 to lock outer end cap 22 in the retracted position. With reference to FIG. 1, one of the outer end caps 22 may be placed in one of the receiving areas 24 and pressed to compress the respective inner end cap 20 against the cassette 16 to permit the other end of the cassette 16 (and therefore outer end cap 22) to then be placed in the other respective receiving area 24. The process may be generally performed in reverse to move the cassette 16 from receiving areas 26 to receiving areas 24. Thus, the covering mechanism 12 has been moved from one position to another position, irrespective of variations in the width of the cargo region 14.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A vehicle comprising:
  a cargo region;
  a cassette having two ends and a spooled cover connected to a portion of the vehicle, wherein each of the two ends further comprises:
    at least one inner end cap; and
    at least one outer end cap disposed over the inner end cap;
    wherein the inner end cap further comprises at least one track formed in an outer surface thereof, wherein the at least one track further comprises an axially extending first portion and a radially extending second portion that is in communication with the first portion:
    wherein the outer end cap further comprises at least one tab that extends from an inside surface thereof;
    wherein the tab is adapted to pass linearly along the first portion of the track to the second portion of the track to allow the
    outer end cap to move between an extended position and a retracted position.

2. The vehicle according to claim 1, wherein:
  the cargo region has at least a first covering position and a second covering position;
  each of the first and second covering positions has two receiving areas; and
  each of to two receiving areas is adapted to receive a respective outer end cap of the cassette.

3. The vehicle according to claim 2, wherein the receiving areas of the first covering position are spaced apart from one another by a first predetermined distance and wherein the receiving areas of the second covering position are spaced apart from one another by a second predetermined distance that is different than the first predetermined distance.

4. A covering mechanism for covering a portion of a vehicle; comprising:
  a cassette;
  at least one inner end cap disposed at an end of the cassette, wherein the inner end cap further comprises at least one track having positioned on an outside portion thereof;
  wherein the at least one track has a first portion that extends axially along an outer surface of the inner end cap and a second portion that is in communication with the first portion and extends radially round the outer surface of the inner end cap; and
  at least one outer end cap disposed over the inner end cap, wherein the outer end cap includes at least one tab that extends from an inside surface thereof;
  wherein the tab is adapted to pass linearly along the first portion of the track to the second portion of the track to allow the outer end cap to move between an extended position and a retracted position.

5. The covering mechanism according to claim 4, wherein:
  the outer end cap is in the retracted position when the tab is positioned in the second portion; and
  the outer end cap is in the extended position when the tab is not positioned in the track.

6. The covering mechanism according to claim 4, further comprising two tabs disposed at radially opposite sides of the outer end cap.

7. The covering mechanism according to claim 6, further comprising:
   two tracks disposed at radially opposite sides of the inner end cap;
   wherein each of the two tabs is adapted to cooperate with a respective one of the two tracks to move the outer end cap between the refracted position and the extended position.

8. The covering mechanism according to claim 4, further comprising a groove disposed radially along the outside surface of the outer end cap.

9. The covering mechanism according to claim 8, wherein the tab is movable in the groove between a first location and a second location.

10. The covering mechanism according to claim 9, wherein:
   the tab is positioned to travel along the track to allow the outer end cap to move between the extended position and the retracted position when the tab is positioned at the second location; and
   the tab is positioned to prevent the outer end cap to move between the retracted position and the extended position when the tab is positioned at the first location.

11. The covering mechanism according to claim 10, further comprising a biasing member that biases the tab toward the first position.

12. The covering mechanism according to claim 10, further comprising a guide adapted to allow the outer end cap to move only axially with respect to the inner end cap.

13. The covering mechanism according to claim 4, wherein the second portion of the track is disposed so as to be positioned at an approximate right angle with respect to the first portion of the track.

14. A covering mechanism for covering a portion of a vehicle, comprising:
   a cassette;
   at least one inner end cap disposed at an end of the cassette, wherein the inner end cap further comprises at least one track having positioned on an outside portion thereof;
   wherein the at least one track has a first portion that extends axially along an outer surface of the inner end cap and a second portion that is in communication with the first portion and extends radially around the outer surface of the inner end cap; and
   at least one outer end cap disposed over the inner end cap, wherein the outer end cap includes at least one groove disposed radially along the outside surface of the outer end cap and a tab moveably disposed within the groove between a first location and a second location, wherein the tab extends inwardly from an inside surface of the outer end cap;
   wherein the tab is adapted to pass along the first portion of the track to the second portion of the track to allow the outer end cap to move between an extended position and a retracted position.

15. The covering mechanism according to claim 14, further comprising a biasing member that biases the tab into the first location within the groove.

16. The covering mechanism according to claim 15, wherein the tab is prevented from traveling along the track in the inner end cap when the tab is positioned in the first location within the groove.

17. The covering mechanism according to claim 15, wherein the tab travels along the track in the inner end cap when the tab is moved from the first location and into the second location.

* * * * *